Figure 1:
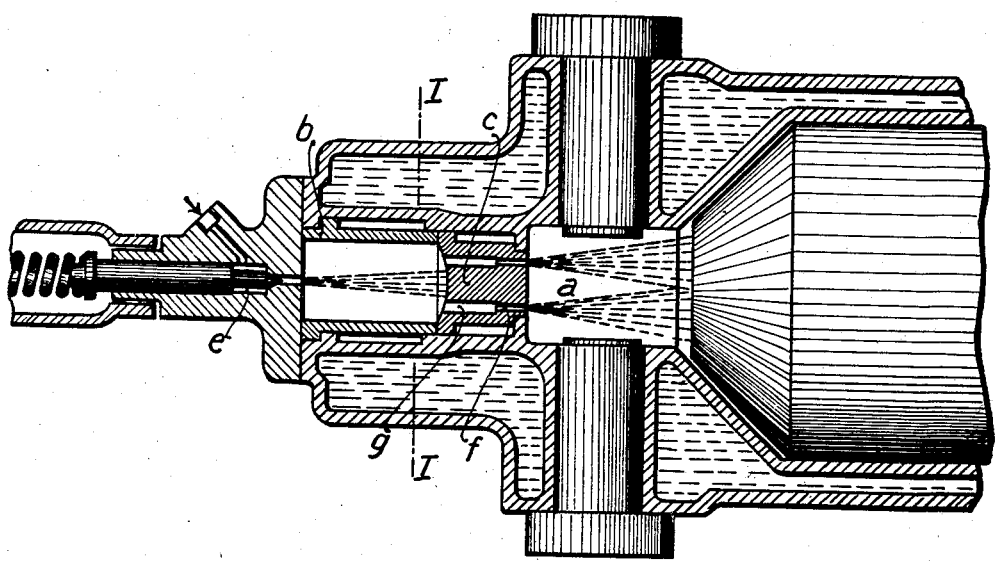

Feb. 28, 1928.

F. MODERSOHN 1,660,424

ARRANGEMENT OF PRECOMBUSTION CHAMBER FOR INJECTION OIL ENGINES

Filed Feb. 26, 1926

INVENTOR:
Fritz Modersohn
BY: Ruep, Boyne & Bakelar
ATTORNEYS.

Patented Feb. 28, 1928.

1,660,424

UNITED STATES PATENT OFFICE.

FRITZ MODERSOHN, OF BERGISCH-GLADBACH, GERMANY.

ARRANGEMENT OF PRECOMBUSTION CHAMBER FOR INJECTION-OIL ENGINES.

Application filed February 26, 1926, Serial No. 90,741, and in Germany December 30, 1925.

The present invention refers to such types of injection-oil engines, which have a precombustion-chamber separate from the main combustion-chamber, the latter being formed by a restricted space at the breech-end of the cylinder, which also accommodates inlet and exhaust valves. This arrangement is well-known for horizontal types of engines. Generally the object of pre-combustion-chambers is to make the unsprayed fuel jet strike against some hot parts of the wall of the chamber in order to effect pulverization. A small fraction of the charge ignites and the consequent rise in pressure in the chamber drives the main part of the charge through the holes of the bottom into the cylinder which it enters partly in liquid, partly in gaseous state. In vertical engines as a rule the main combustion-chamber is formed by the top part of the cylinder itself the valves are vertically inserted into the bottom face of the cylinder or cylinder head and do not affect the shape of the combustion-chamber. These engines have the pre-combustion-chamber arranged on top of the main combustion chamber which is fitted with a thin-walled "cup" having a number of holes spaced round the circumference. Horizontal engines having a main combustion chamber of reduced width as this arrangement cannot be used as the fuel jets leaving the holes are burning; they would strike against the wall of the main combustion chamber and this would cause incomplete combustion, the flames would also damage the valves.

The present invention consists in an arrangement of pre-combustion chamber for engines having a combustion chamber of reduced width; this arrangement ensuring satisfactory preliminary pulverizing in the pre-combustion chamber as well as complete combustion in the main combustion chamber proper. The arrangement provides for a pre-combustion chamber having a nozzle with a number of holes the diameter of which is larger at the side facing the precombustion chamber and reduced at the exit to the main combustion chamber. The center part between the holes of this nozzle is of sufficient width to take the full fuel-jet, or any rate the major part of it. The reduced diameter of the holes is required because the face of the nozzle towards the pre-combustion chamber must have a sufficient large unbroken surface to act as pulverizer, on the other hand the jet must leave the nozzle with a velocity sufficient to ensure thorough mixing of burning fuel particles and air throughout the main combustion chamber. This is necessary to obtain quick and complete combustion.

Experience has shown that the holes must have a considerable length in order to control the direction of the jet in such a way that it does not strike the walls of the main combustion chamber.

It has also been established that it is advisable to direct the jet entering the pre-combustion chamber so that it strikes against a heated surface before the liquid particles are sprayed again through the holes of the pre-combustion chamber. These holes are therefore so dimensioned and so disposed that they leave between them sufficient unbroken surface that the whole jet or at any rate the major part of it will strike against it.

To increase the pulverizing effect of the process the parts of the jets as far as possible should strike the surface at right angles. This can be accomplished by giving the surface a spherically concave shape the center of the sphere being in or near the issuing point of the spray-valve.

Figure 2:
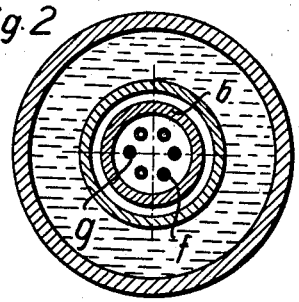

Fig. 1 shows a longitudinal section, Fig. 2 a cross-section at I—I of an application of this invention; $a$ is the spray-valve, $b$ the pre-ignition chamber which is in communication with the main combustion chamber, $a$ through nozzle-part $c$ containing a number of holes (in this instance 6). The diameter of the holes at the end $g$ near the pre-ignition chamber is larger than at the other end $f$. The face of the nozzle-part $c$ towards the pre-ignition chamber is concave. The unbroken surface between the holes $g$ is of such size that the jets strike completely against this surface or very nearly so very little of them finding a direct way to the holes $g$.

The effect is that the jet is pulverized by striking against this surface and enters the part $g$ of the holes in this pulverized state. By passing through $g$ and $f$ the spraying process is completed. The pulverized oil entering $g$ is probably partly ignited and the rise in pressure due to this ignition forces the rest of the oil charge together with the gaseous products of combustion through the narrow-part of the holes into the combustion chamber *a*, where they come in contact with the turbulent air compressed by the piston. In this way a thorough mixture of air and oil is produced without the jets of oil striking against the walls of this part of the combustion chamber or against the valves.

What I claim as an invention is:

1. A device of the character described, comprising, in combination, a main combustion chamber having a restricted portion, a pre-combustion chamber, a nozzle between the main and pre-combustion chambers, said nozzle having a plurality of axial extending openings communicating with said chambers, said openings being disposed in a circle enclosing a solid area, the length of the openings being many times greater than their diameter and the diameter of said openings being reduced at the end communicating with the main combustion chamber, and a spray valve for injecting fuel into the pre-combustion chamber, said spray valve being so disposed as to deliver the major part of its jet upon the solid area enclosed between said openings.

2. A device of the character described, comprising, in combination, a main combustion chamber having a restricted portion, a pre-combustion chamber, a nozzle between the main and pre-combustion chambers, said nozzle having a plurality of axially extending openings communicating with said chambers, said openings being disposed in a circle enclosing a solid area, the length of the openings being many times greater than their diameter and the diameter of said openings being reduced at the end communicating with the main combustion chamber, and a spray valve for injecting fuel into the pre-combustion chamber, said spray valve being so disposed as to deliver the major part of its jet upon the solid area enclosed between said openings, the surface of the nozzle exposed to said spray being concaved.

In testimony whereof I have signed my name to this specification.

Dr. FRITZ MODERSOHN.